US010033894B2

(12) United States Patent
Berke et al.

(10) Patent No.: US 10,033,894 B2
(45) Date of Patent: Jul. 24, 2018

(54) AUTOMATIC PAPER SELECTION FOR CUSTOM MEDIA SIZES

(71) Applicant: Xerox Corporation, Norwalk, CT (US)

(72) Inventors: David Berke, London (GB); Paul R. Conlon, South Bristol, NY (US)

(73) Assignee: Xerox Corporation, Norwalk, CT (US)

( * ) Notice: Subject to any disclaimer, the term of this patent is extended or adjusted under 35 U.S.C. 154(b) by 3 days.

(21) Appl. No.: 14/838,602

(22) Filed: Aug. 28, 2015

(65) Prior Publication Data

US 2017/0064113 A1    Mar. 2, 2017

(51) Int. Cl.
| H04N 1/00 | (2006.01) |
| B65H 1/28 | (2006.01) |
| B65H 7/20 | (2006.01) |
| B65H 7/02 | (2006.01) |
| B65H 5/26 | (2006.01) |

(52) U.S. Cl.
CPC .......... *H04N 1/00708* (2013.01); *B65H 1/28* (2013.01); *B65H 5/26* (2013.01); *B65H 7/02* (2013.01); *B65H 7/20* (2013.01); *H04N 1/00588* (2013.01); *H04N 1/00737* (2013.01); *H04N 1/00779* (2013.01); *H04N 2201/0094* (2013.01)

(58) Field of Classification Search
None
See application file for complete search history.

(56) References Cited

U.S. PATENT DOCUMENTS

| 5,384,621 | A |  | 1/1995 | Hatch et al. |
| 6,118,972 | A | * | 9/2000 | Yamazaki ............ G03G 15/607 |
|  |  |  |  | 399/370 |
| 6,122,393 | A |  | 9/2000 | Schweid et al. |
| 6,752,082 | B2 |  | 6/2004 | Derhak et al. |
| 6,894,791 | B1 |  | 5/2005 | Wheeler |
| 6,974,269 | B2 |  | 12/2005 | Lermant et al. |
| 7,548,328 | B2 |  | 6/2009 | Hult et al. |
| 8,405,872 | B2 |  | 3/2013 | Sekhon |
| 8,446,643 | B2 |  | 5/2013 | Stewart |
| 8,908,236 | B1 |  | 12/2014 | Rudge et al. |
| 8,919,770 | B2 |  | 12/2014 | Mattern et al. |
| 2001/0035987 | A1 | * | 11/2001 | Ishido ................ H04N 1/00681 |
|  |  |  |  | 358/475 |
| 2007/0057430 | A1 | * | 3/2007 | Yamazaki ................ B65H 3/44 |
|  |  |  |  | 271/9.13 |

(Continued)

*Primary Examiner* — Lennin Rodriguezgonzale
(74) *Attorney, Agent, or Firm* — Gibb & Riley, LLC

(57) ABSTRACT

An image production device includes a processor, media feed trays having media size sensors, and a marking device. A scanner connected to the processor, scans images on a two-dimensional document and determines one dimension of the document. The processor automatically determines dimensions of media in the media feed trays and compares the dimensions of media in each of the media feed trays to the one dimension of the document. Responsive to the one dimension of the document matching one of the dimensions of the media in one of the media feed trays, the processor identifies a matching feed tray based only on one dimension of the document in the scanner. Media is automatically selected from the matching feed tray and fed to the marking device. The marking device renders images on the media selected from the matching feed tray. The processor outputs the media containing the images.

14 Claims, 4 Drawing Sheets

(56) References Cited

U.S. PATENT DOCUMENTS

| | | | |
|---|---|---|---|
| 2012/0120418 A1* | 5/2012 | Okayama | H04N 1/00408 358/1.2 |
| 2013/0044339 A1* | 2/2013 | Takahashi | H04N 1/00578 358/1.13 |
| 2015/0210494 A1* | 7/2015 | Takata | G03G 15/502 358/1.15 |

* cited by examiner

AUTOMATIC PAPER SELECTION FOR CUSTOM MEDIA SIZES

BACKGROUND

Systems and methods herein generally relate to multi-function machines having print engines and, more particularly, to systems and methods of automatically selecting custom sized printable media based on the size of a scanned document.

The present invention is directed to a system that generally scans original documents and converts these documents into electronic image data that can be utilized by a printing system to render the electronic image on a subsequent recording medium. More particularly, the present invention is directed to a system and method for detecting scanning artifacts that are produced during the conversion of the image on a scanned document into electronic image data.

SUMMARY

In one aspect of a device disclosed herein, automatic custom media selection is augmented based on matching paper tray size information with scan measurements of a document for production. The process identifies loaded custom media having a dimension equal to only one dimension of a two-dimensional document that has been scanned for input. The system can use a more accurate fast scan value of the document and then choose a matching paper tray with loaded custom media, based on the best match for the other loaded dimensions.

Systems and methods herein enable an intelligent decision based on the input media dimension according to the availability of non-standard media loaded in the paper trays. The disclosed method minimizes the likelihood of a false size determination, which improves outcomes for the user. Since most image production devices are designed to work with standard media, systems and methods herein additionally use tray detection to help drive the scanned media size detection.

In one aspect disclosed herein, an image production device includes a processor, media feed trays, and a marking device. Each of the media feed trays comprises a media size sensor connected to the processor. A scanner is connected to the processor. The scanner comprises a scan bar scanning images on a two-dimensional document and determines one dimension of the document. The marking device comprises a print engine operatively connected to the processor. The processor automatically determines dimensions of media in the media feed trays using the media size sensor. The processor automatically compares the dimensions of media in each of the media feed trays to the one dimension of the document. Responsive to the one dimension of the document matching one of the dimensions of the media in one of the media feed trays, the processor identifies a matching feed tray comprising media having a dimension matching the one dimension. The matching feed tray is identified based only on one dimension of the document in the scanner. Media is automatically selected from the matching feed tray and the media is fed to the print engine of the marking device. The marking device renders images on the media selected from the matching feed tray. The processor outputs the media containing the images.

An exemplary scanning system herein includes a processor, media feed trays, and a marking device. Each of the media feed trays comprises a media size sensor connected to the processor. The marking device comprises a print engine operatively connected to the processor. The processor automatically determines dimensions of media in the media feed trays using the media size sensor. The processor obtains only one dimension of a two-dimensional document to be produced. The processor automatically compares the dimensions of media in each of the media feed trays to the one dimension of the document to be produced. The processing identifies a matching feed tray comprising media having a dimension matching the one dimension. The matching feed tray is identified based only on one dimension of the document. The processor automatically selects media from the matching feed tray for feeding to the print engine of the marking device.

According to an exemplary method herein, dimensions of media in media feed trays of a computerized device are determined. A document is scanned using the computerized device. The scanning determines only one dimension of the document. The dimensions of the media in each of the media feed trays are compared to the one dimension of the document, using the computerized device. Responsive to the one dimension of the document matching one of the dimensions of the media in one of the media feed trays, a matching feed tray comprising media having a dimension matching the one dimension is identified. The matching feed tray is identified based only on one dimension of the document. Media from the matching media tray is fed to a marking device associated with the computerized device. Images are rendered on the media selected from the matching feed tray, using the marking device. The media containing the images is output.

These and other features are described in, or are apparent from, the following detailed description.

BRIEF DESCRIPTION OF THE DRAWINGS

Various examples of the systems and methods are described in detail below, with reference to the attached drawing figures, which are not necessarily drawn to scale and in which.

DETAILED DESCRIPTION

Figure 1:
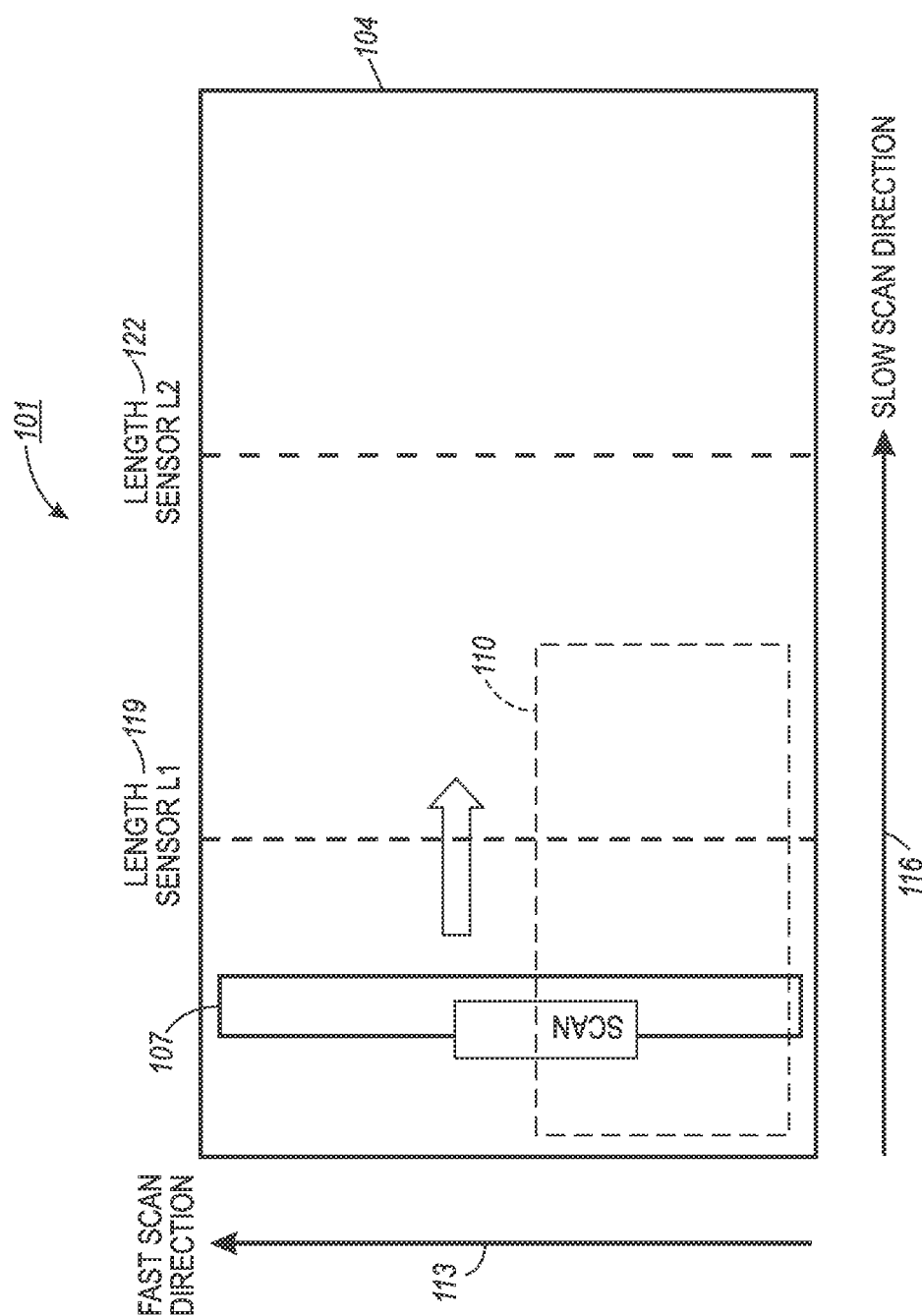
FIG. 1 is a plan view of a scanning device according to systems and methods herein.

The disclosure will now be described by reference to a printing apparatus that includes an integral scanner. While the disclosure will be described hereinafter in connection with specific systems and methods thereof, it will be understood that limiting the disclosure to such specific systems and methods is not intended. On the contrary, it is intended to cover all alternatives, modifications, and equivalents as may be included within the spirit and scope of the disclosure as defined by the appended claims.

For a general understanding of the features of the disclosure, reference is made to the drawings. In the drawings, like reference numerals have been used throughout to identify identical elements.

FIG. 1 shows a scanning device, indicated generally as 101. The scanning device 101 includes a platen 104, which may comprise glass, mylar, or other appropriate clear substrate. The scanning device 101 also includes an image capture device such as scan bar 107. Image capture devices include scanners, cameras, photography equipment, facsimile machines, photo reproduction equipment, digital printing presses, xerographic devices, and the like. The scan bar 107 is one image capture device that optically scans images, print media, and the like, and converts the scanned image into a digitized format. Modern digital scanners typically incorporate a charge-coupled device (CCD) or a contact image sensor (CIS) as the image sensing receptor(s). The scanning bar produces a signal of the scanned image data. Such a digital signal contains information about pixels such as color value, intensity, and their location within the scanned image.

When a document 110 is placed on the platen 104 of a printing device and the platen cover is closed, the scanner takes a fast measurement of the paper height by performing a fast scan in the cross-process direction (sometimes referred to as the fast scan direction, indicated by arrow 113). This is a fast operation, as it does not require movement of the scan bar 107. However, there is usually not sufficient time prior to the closing of the platen cover to determine the length of the document 110, as this requires the scan bar 107 to traverse the document 110 in the process direction (sometimes referred to as the slow scan direction, indicated by arrow 116). Additionally, the platen 104 would need to be kept open to reliably detect the edge of the document 110 in the slow scan direction 116.

On printing products, when a non-standard size media (e.g., 8"×8") is scanned via the platen 104, the device makes a best guess size for the input image size based on the dimension measured by scanning the media. As described above, scanning can be performed in both the cross-process (fast scan 113) and process (slow scan 116) directions. Unlike the fast scan, which is pixel based, the slow scan uses a sensor to detect if a sheet of media falls within a limited set of "zones". It is typically not feasible to carry out a pre-scan of the media, which requires scanning in the slow scan direction 116, to determine the actual size of the input media due to time and configuration constraints. This can result in cropping of the output image as a result of a combination of an incorrect inferred size of the input media and auto-paper select (APS) defaulting to a standard media size.

When scanning a document 110 having a non-standard/custom media size, the scanner may return 'unknown' as the media size, as the cross process dimension returned will not fall within a zone for a standard media size. Once the cross process dimension (height) of the media on the platen is determined, the process described herein makes a comparison of the cross process dimension of the media on the platen 104 with media loaded in the paper trays. If a match is found between this dimension (height) and either dimension of custom size media loaded in any of the paper trays (within a reasonable tolerance, such as +/−1 mm), the device assumes that this is the media to use for the output. This assumption is reasonable as it is very likely that the user will have loaded the media on which they expect their job to be marked in one of the trays. Either dimension of the custom media loaded in the paper trays is acceptable in order to allow for media being loaded in either the long edge or short edge orientation in the paper trays.

For example, if the user places an 8"×12" sheet on the platen, the fast scan determines that the input image sheet cross process dimension (height) is 8", using a fast scan. The device then compares this dimension with those of any custom media loaded in the paper trays. If any such media has a dimension of 8" (+/−a reasonable tolerance) on either side, it is assumed that this is the media to be used for marking the image. In some cases, an image rotation may be required, depending on the orientation of the output media in the paper tray.

Should more than one media type loaded in the paper trays match the fast scan measured dimension of the input media, a pop up box may be invoked on a user interface to request the user to select the correct output media. The choice of media for output is optimized to only include custom media sizes where a single dimension matches that of the input media and avoids the possibility of selecting the incorrect output media.

Systems and methods herein further enable scaling can be taken into account. For example, if an increase in magnification by 20% is used, then the new image size can be compared to loaded media to make a better selection (which is not limited to non-standard media). Other constraint optimizations are possible (weighting, priorities, etc.).

In some cases, improvement in the accuracy of the size determination could be made by additionally accounting for detection in the slow scan direction 116 using zones. For example, the scanning device 101 may include length sensors in the slow scan direction 116, such as length sensor L1 (119) and length sensor L2 (122). As illustrated in FIG. 1, if, when the scan is completed in the slow scan direction, length sensor L1 (119) is determined as being covered by the document 110, then any media which has at least one dimension being less than L1 length (starting from the origin) could be eliminated from the media selection list. That is, selection of custom media, which are determined as being invalid from measurement using the slow scan zone measurement could be eliminated from the media selection list.

Figure 2:
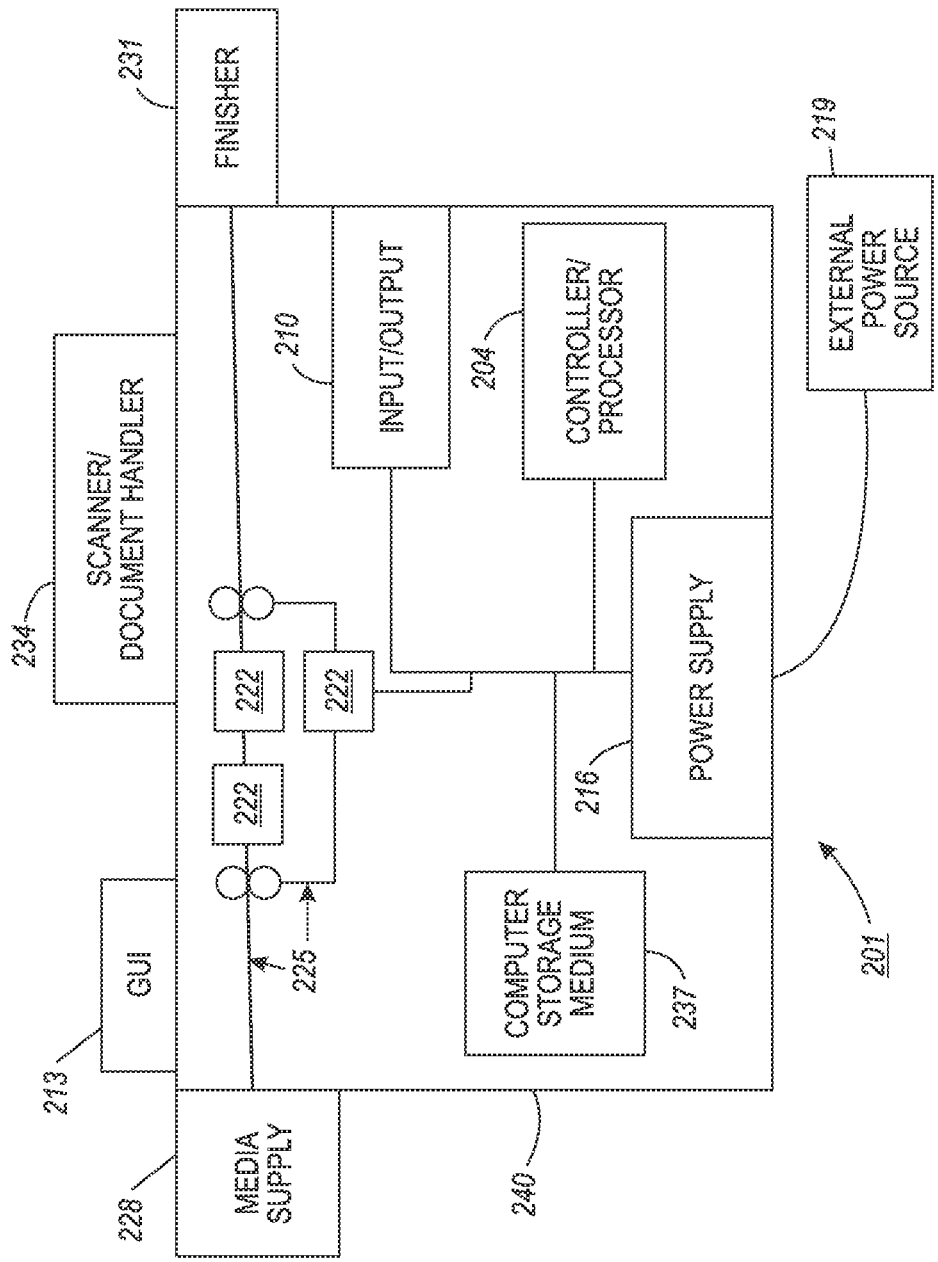
FIG. 2 is an elevational schematic diagram of a multi-function device according to systems and methods herein.

FIG. 2 illustrates a multifunction device 201 that can be used with systems and methods herein and can comprise, for example, a printer, a copier, a fax machine, etc. The multifunction device 201 includes a controller/processor 204 and an input/output device 210 operatively connected to the controller/processor 204. The controller/processor 204 may be connected to a computerized network external to the multifunction device 201 through a communications port of the input/output device 210. In addition, the multifunction device 201 can include at least one accessory functional component, such as a user interface (GUI) 213. The GUI 213 acts as common interface for job submission and operates on power supplied from a power supply 216. An external power source 219 may provide electrical power to the multifunction device 201 through the power supply 216. The input/output device 210 is used for communications to and from the multifunction device 201. The controller/processor 204 controls the various actions of the multifunction device 201.

The multifunction device 201 may include at least one marking device 222 (sometimes referred to as print engines) operatively connected to the controller/processor 204. A media transportation path 225 is positioned to supply sheets of printable media from a media supply 228 (that includes paper trays media size sensors connected to the controller/processor 204) to the marking device(s) 222, etc., along the media transportation path 225. After receiving various markings from the printing engine(s), the sheets of media can optionally pass to a finisher 231 which can fold, staple, sort, etc., the various printed sheets.

Further, the marking device 222 is any device capable of rendering an image. The set of marking devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

In addition, the multifunction device 201 can include one or more accessory functional component (such as a scanner/document handler 234, etc.) that also operates on the power supplied from the external power source 219 (through the power supply 216).

The scanner/document handler 234 may be any image input device capable of obtaining information from an image, such as scanning device 101 described above. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the art, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

The multifunction device 201 may also include a non-transitory computer storage medium 237 (which can be optical, magnetic, capacitor based, etc.) readable by the controller/processor 204. The non-transitory computer storage medium 237 stores instructions that the controller/processor 204 executes to allow the multifunction device 201 to perform its various functions, such as those described herein.

It should be understood that the controller/processor 204 as used herein comprises a computerized device adapted to perform (i.e., programmed to perform, configured to perform, etc.) the below described system operations. According to systems and methods herein, the controller/processor 204 comprises a programmable, self-contained, dedicated mini-computer. The details of such computerized devices are not discussed herein for purposes of brevity and reader focus.

Thus, as shown in FIG. 2, a device housing 240 has one or more functional components that operate on power supplied from the external power source 219, which may comprise an alternating current (AC) power source, through the power supply 216. The power supply 216 can comprise a power storage element (e.g., a battery) and connects to the external power source 219. The power supply 216 converts the external power into the type of power needed by the various components of the multifunction device 201.

Multifunctional devices, such as shown in FIG. 2, are typically full featured. Various ones of the features provide one or more functions to be performed on a job. For example, a job may include capturing an image at the image input section for storage. The image may undergo a significant amount of image processing allowing for the minimization of image related artifacts and various electronic pages may be edited after the job has been suitably stored. After outputting of the stored job, a host of finishing operations, such as stapling, folding, and trimming may be performed on the hardcopy version of the job to optimize its appearance.

As would be understood by those ordinarily skilled in the art, the multifunction device 201 shown in FIG. 2 is only one example and the systems and methods herein are equally applicable to other types of document handling devices that may include fewer components or more components. For example, while a limited number of printing engines and paper paths are illustrated in FIG. 2, those ordinarily skilled in the art would understand that many more paper paths and additional printing engines could be included within any printing device used with systems and methods herein.

While the systems and methods herein are disclosed with reference to a multifunction device 201, it is contemplated that scanning can be accomplished by a stand-alone scanner. For example, the scanning device 101 may be used for non-printed, scan-to-file jobs, etc.

Figure 3:
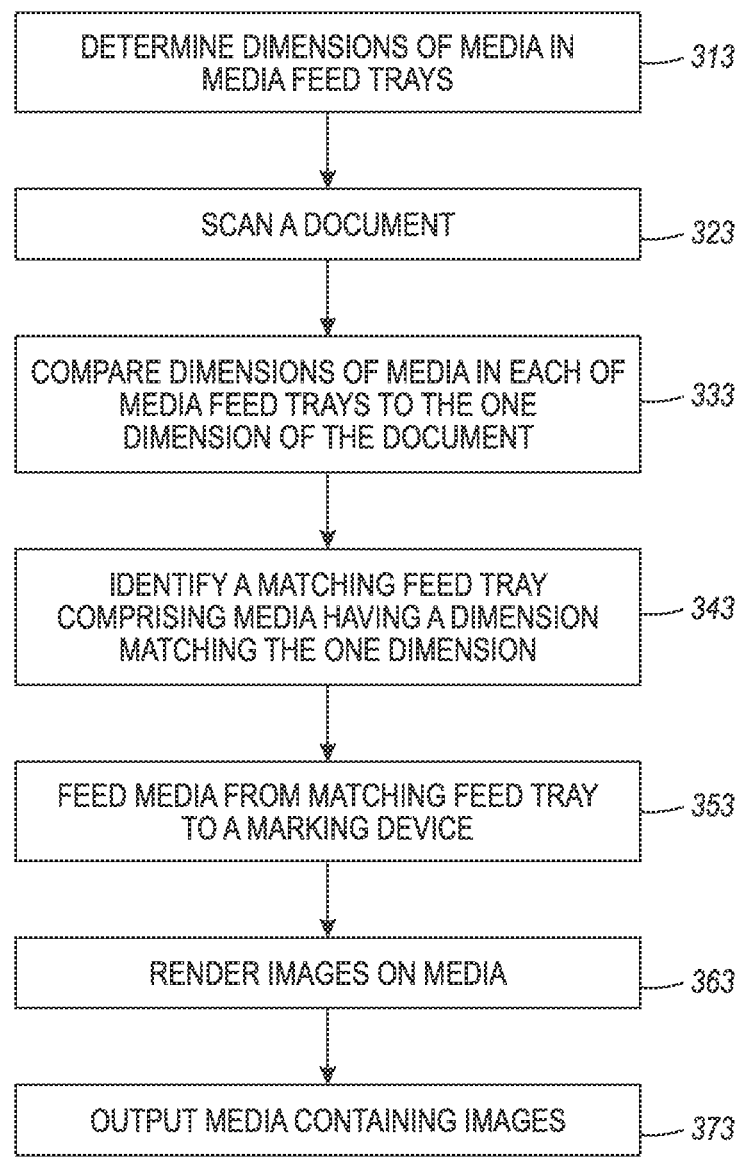
FIG. 3 is a flow diagram illustrating a broad overview of a process according to systems and methods herein.

FIG. 3 is a flow diagram illustrating the processing flow of an exemplary method according to the present disclosure. The method is useful for automatically selecting paper for custom media sizes using a single dimension of a scanned document. At 313, dimensions of media in media feed trays are determined. The media feed trays comprise a media size sensor connected to a processor, which determines the length dimension and the width dimension of the media in the media feed trays. A document is scanned, at 323. The scanning determines at least one dimension of the document. The dimensions of the media in each of the media feed trays are compared to the one dimension of the document, at 333. Responsive to the one dimension of the document matching one of the dimensions of the media in one of the media feed trays, at 343, a matching feed tray comprising media having a dimension matching the one dimension is identified. The matching feed tray is identified based only on one dimension of the document. At 353, media from the matching feed tray is fed to a marking device. At 363, images are rendered on the media selected from the matching feed tray, using the marking device. The media containing the images is output, at 373.

In other words, once the cross process dimension (height) and process dimension (width) of the media on the platen is determined, the process described herein makes a comparison of the dimensions of the media on the platen with media loaded in the paper trays. This process augments/complements current paper selection schemes by matching tray size sensing information with scan size sensing in order to improve the likelihood of correct paper size determination. The process described herein can use a single dimension of the scanned media on the platen. If a non-standard size is detected on the platen (often falling within "gaps" between standard sizes), and media that matches this gap is loaded in one of the paper trays, it is more likely that the user intended to use this loaded media. The media can be selected automatically, or the user can confirm the desired non-standard media.

Figure 4:
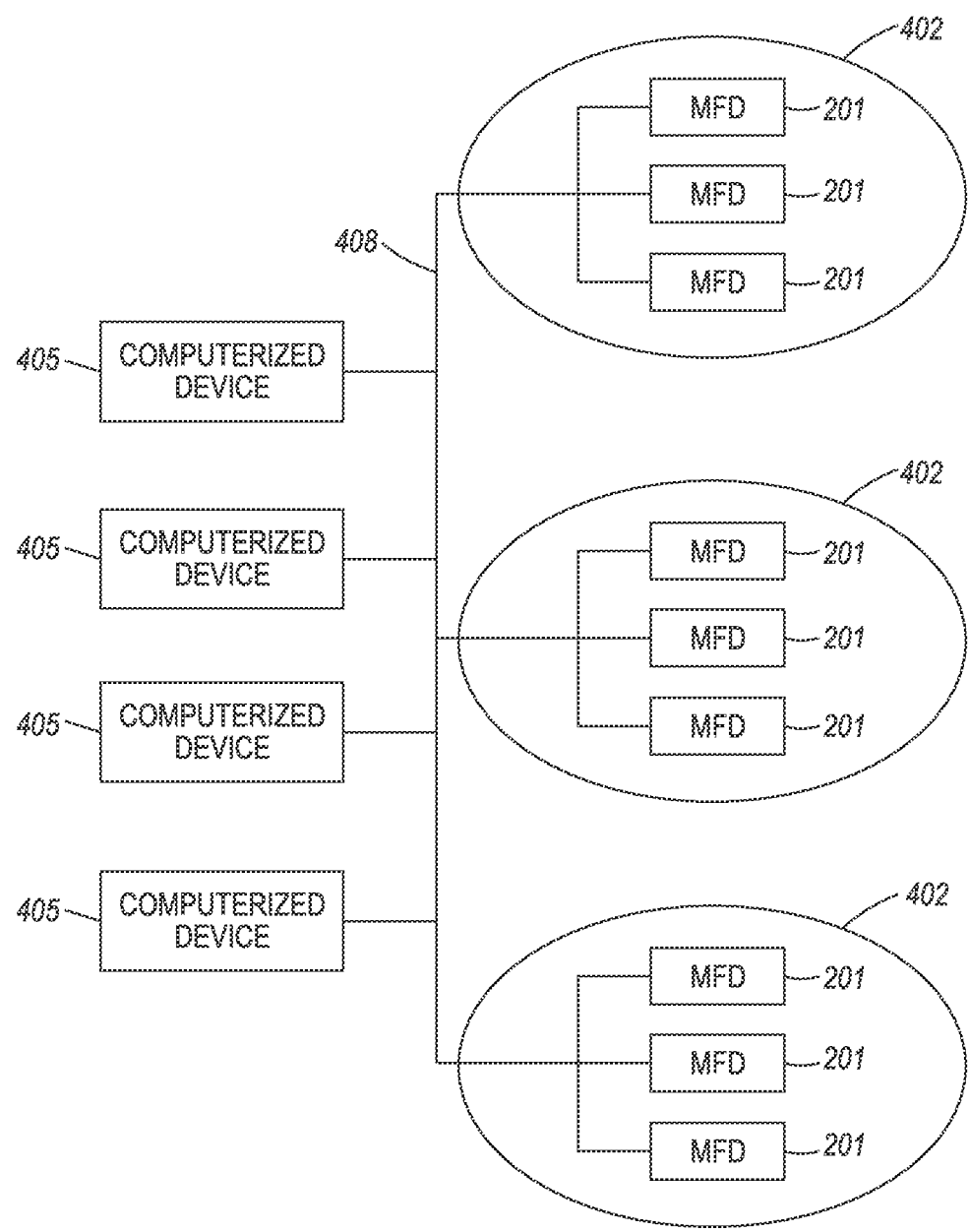
FIG. 4 is a schematic diagram illustrating systems and methods herein.

As shown in FIG. 4, exemplary printers, copiers, multifunction machines, and multi-function devices (MFD) 201 may be located at various different physical locations 402. Other devices according to systems and methods herein may include various computerized devices 405. The computerized devices 405 can include print servers, printing devices, personal computers, etc., and are in communication (operatively connected to one another) by way of a network 408. The network 408 may be any type of network, including a local area network (LAN), a wide area network (WAN), or a global computer network, such as the Internet.

The hardware described herein plays a significant part in permitting the foregoing method to be performed, rather than function solely as a mechanism for permitting a solution to be achieved more quickly, (i.e., through the utilization of a computer for performing calculations). As would be understood by one ordinarily skilled in the art, the processes described herein cannot be performed by humans alone (or one operating with a pen and a pad of paper) and instead, such processes can only be performed by a machine. Specifically, processes such as printing, scanning, electronically altering images using an image processor etc., require the utilization of different specialized machines. Therefore, for example, the automatic detection of media size by scanning, rotation of images (if necessary), and printing/scanning, which are performed by the devices herein, cannot be performed manually (because machines are required to perform digital image processing and printing) and such devices are integral with the processes performed by methods herein. Further, such machine-only processes are not mere "post-solution activity" because the automated analysis of each scanned image size is integral with the steps of the processes described herein. Similarly, the scanning and image production utilize special purpose equipment (telecommunications equipment, routers, switches, etc.) that is distinct from a general-purpose processor. In other words, these various machines are integral with the methods herein because the methods cannot be performed without the machines (and cannot be performed by humans alone).

Aspects of the present disclosure are described herein with reference to flowchart illustrations and/or block diagrams of methods, apparatus (systems), and computer program products according to various systems and methods. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, it is not intended for the claims presented below to be limited by the attached drawings, but instead the attached drawings are merely provided to illustrate a few ways in which the claimed features can be implemented.

The corresponding structures, materials, acts, and equivalents of all means or step plus function elements in the claims below are intended to include any structure, material, or act for performing the function in combination with other claimed elements as specifically claimed. The descriptions of the various systems and methods of the present disclosure have been presented for purposes of illustration, but are not intended to be exhaustive or limited to the systems and methods disclosed. Many modifications and variations will be apparent to those of ordinary skill in the art without departing from the scope and spirit of the described systems and methods. The terminology used herein was chosen to best explain the principles of the systems and methods, the practical application or technical improvement over technologies found in the marketplace, or to enable others of ordinary skill in the art to understand the systems and methods disclosed herein.

The terms printer or printing device as used herein encompasses any apparatus, such as a digital copier, bookmaking machine, facsimile machine, multifunction machine, etc., which performs a print outputting function for any purpose. The details of printers, printing engines, etc., are well known by those ordinarily skilled in the art and are not described in detail herein to keep this disclosure focused on the salient features presented. The systems and methods herein can encompass devices that print in color, monochrome, or handle both color and monochrome image data. All foregoing systems and methods are specifically applicable to electrostatographic and/or xerographic machines and/or processes.

The terminology used herein is for the purpose of describing particular systems and methods only and is not intended to be limiting of this disclosure. As used herein, the singular forms "a", "an", and "the" are intended to include the plural forms as well, unless the context clearly indicates otherwise. It will be further understood that the terms "comprises," "comprising," and/or "including," when used in this specification, specify the presence of stated features, integers, steps, operations, elements, and/or components, but do not preclude the presence or addition of one or more other features, integers, steps, operations, elements, components, and/or groups thereof. Further, the terms "automated" or "automatically" mean that once a process is started (by a machine or a user), one or more machines perform the process without further input from any user.

In addition, terms such as "right", "left", "vertical", "horizontal", "top", "bottom", "upper", "lower", "under", "below", "underlying", "over", "overlying", "parallel", "perpendicular", etc., used herein, are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

The descriptions of the various systems and methods of the present disclosure have been presented for purposes of illustration, but are not intended to be exhaustive or limited to the systems and methods disclosed. Many modifications and variations will be apparent to those of ordinary skill in the art without departing from the scope and spirit of the described systems and methods. The terminology used herein was chosen to best explain the principles of the systems and methods, the practical application or technical improvement over technologies found in the marketplace, or to enable others of ordinary skill in the art to understand the systems and methods disclosed herein.

It will be appreciated that the above-disclosed and other features and functions, or alternatives thereof, may be desirably combined into many other different systems or applications. Those skilled in the art may subsequently make various presently unforeseen or unanticipated alternatives, modifications, variations, or improvements therein, which are also intended to be encompassed by the following claims. Unless specifically defined in a specific claim itself, steps or components of the systems and methods herein should not be implied or imported from any above example as limitations to any particular order, number, position, size, shape, angle, color, or material.

What is claimed is:

1. An image production device, comprising:
a processor;
media feed trays containing media, each of said media feed trays comprising a media size sensor connected to said processor;
a scanner connected to said processor, said scanner comprising a platen and a scan bar scanning images on a document placed on said platen, said document comprising a two-dimensional document, and said scanner scanning said document, using said scan bar, and determining only one dimension of said document; and
a marking device operatively connected to said processor,
said processor automatically determining length dimensions and width dimensions of said media in each of said media feed trays using said media size sensor in said media feed trays;
said scanner scanning said document on said platen in only a cross-process direction to determine said only one dimension of said document,
after said scanning said document on said platen, said processor automatically comparing said length dimensions and said width dimensions of said media in each of said media feed trays to said one dimension of said document on said platen,
responsive to said one dimension of said document matching either a length dimension or a width dimension of said media in one of said media feed trays, within a reasonable tolerance, said processor determining the dimensions of said document on said platen based on the availability of said media loaded in said media feed trays,
said processor automatically selecting media from a matching feed tray, said matching feed tray comprising media having a length dimension or width dimension matching said one dimension of said document, within a reasonable tolerance, and feeding said media from said matching feed tray to said marking device,
said marking device rendering images on said media selected from said matching feed tray, and
said processor outputting said media containing said images.

2. The image production device according to claim 1, said marking device further comprising a print engine transferring an image onto a sheet of media.

3. The image production device according to claim 1, further comprising:
a device picking media from said matching feed tray and feeding said media into a media transportation path of said marking device.

4. The image production device according to claim 1, said matching feed tray comprising media matching either said length dimension or said width dimension to said one dimension of said document, within a reasonable tolerance.

5. A scanning system, comprising:
a processor;
a scanner connected to said processor, said scanner comprising a platen and a scan bar scanning images on a document placed on said platen, said document comprising a two-dimensional document, and said scanner determining one of a length dimension and a width dimension of said document by scanning said document using said scan bar; and
media feed trays containing media, each of said media feed trays comprising a media size sensor connected to said processor,
said processor automatically determining length dimensions and width dimensions of said media in each of said media feed trays using said media size sensor in said media feed trays
said scanner scanning said document on said platen in only a cross-process direction to determine said one of a length dimension and a width dimension of said document,
said processor automatically comparing said length dimensions and said width dimensions of said media in each of said media feed trays to said one of said length dimension and said width dimension of said document on said platen,
after said scanning said document on said platen, said processor determining the dimensions of said document on said platen based on the availability of said media loaded in said media feed trays, and
said processor identifying a matching feed tray comprising media having a dimension matching said one of said length dimension and said width dimension, within a reasonable tolerance, said matching feed tray being identified based only on said one of said length dimension and said width dimension of said document on said platen.

6. The scanning system according to claim 5, further comprising:
a marking device operatively connected to said processor, said marking device further comprising a print engine transferring an image onto a sheet of media.

7. The scanning system according to claim 6, further comprising:
a device picking media from said matching feed tray and feeding said media into a media transportation path of said marking device.

8. The scanning system according to claim 5, said matching feed tray comprising media matching either said length dimension or said width dimension to said one of said length dimension and said width dimension of said document, within a reasonable tolerance.

9. A method, comprising:
determining dimensions of media in media feed trays of a computerized device;
scanning an image on a document, using said computerized device, said computerized device comprising a scanner having a platen with said document placed thereon, said scanning determining only one dimension of said document by scanning said document using a scan bar of said scanner;
after said scanning said image on said document, comparing said dimensions of said media in each of said media feed trays to said one dimension of said document, using said computerized device;
responsive to said one dimension of said document matching one of a length dimension and a width dimension of said media in one of said media feed trays, within a reasonable tolerance, determining the dimensions of said document on said platen based on the availability of said media loaded in said media feed trays, using said computerized device;
identifying a matching feed tray comprising media having a length dimension or width dimension matching said one dimension of said document, using said computerized device, said matching feed tray being identified based only on one dimension of said document; and feeding, to a marking device associated with said computerized device, media from said matching feed tray.

10. The method according to claim 9, said media feed trays further comprising:

media size sensors, said method further comprising:

determining said length dimension and said width dimensions of said media in said media feed trays using said media size sensors.

11. The method according to claim 10, further comprising:

automatically comparing said length dimension and said width dimension of said media in said media feed trays to said one dimension of said document, using said computerized device.

12. The method according to claim 11, further comprising:

matching either said length dimension or said width dimension of said media in each of said media feed trays to said one dimension of said document, using said computerized device.

13. The method according to claim 12, further comprising:

automatically rotating the image on said document according to said matching said length dimension or said width dimension of said media in said matching feed tray to said one dimension of said document, using said computerized device.

14. The method according to claim 9, said marking device further comprising:

a print engine, said method further comprising:

rendering images on said media selected from said matching feed tray, using said marking device; and outputting said media containing said images.

* * * * *